(12) United States Patent
Kim et al.

(10) Patent No.: US 10,139,694 B2
(45) Date of Patent: Nov. 27, 2018

(54) REFLECTION TYPE DISPLAY DEVICE

(71) Applicant: LG Display Co., Ltd., Seoul (KR)

(72) Inventors: June-Hwan Kim, Seoul (KR);
Soo-Youn Kim, Goyang-si (KR);
Wy-Yong Kim, Seoul (KR); Hwa-Youl Lee, Paju-si (KR); Seong-Yong Uhm, Goyang-si (KR); Seok-Ho Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/387,062

(22) Filed: Dec. 21, 2016

(65) Prior Publication Data
US 2017/0192331 A1    Jul. 6, 2017

(30) Foreign Application Priority Data
Dec. 30, 2015 (KR) .................. 10-2015-0190360

(51) Int. Cl.
| | | |
|---|---|---|
| G02B 26/00 | (2006.01) | |
| G02F 1/157 | (2006.01) | |
| G02F 1/15 | (2006.01) | |
| G02F 1/163 | (2006.01) | |

(52) U.S. Cl.
CPC ............ G02F 1/157 (2013.01); G02F 1/1508 (2013.01); *G02F 2001/1635* (2013.01)

(58) Field of Classification Search
CPC ............ G02F 1/167; G02F 2001/1676; G02F 2001/1678; G09G 3/344; G09G 3/3446; G09G 3/3453
USPC ............ 359/296; 345/107; 430/32; 204/600
See application file for complete search history.

(56) References Cited

U.S. PATENT DOCUMENTS

2006/0285195 A1* 12/2006 Moriyama ........... G02B 26/026
359/296

* cited by examiner

*Primary Examiner* — William Choi
(74) *Attorney, Agent, or Firm* — Polsinelli PC

(57) ABSTRACT

A reflection type display device includes a color panel including first and second electrodes and color-varying particles of a core-shell structure between the first and second electrodes, wherein the color-varying particles are divided and disposed into first, second and third pixel regions; and a variable light-transmitting panel over the color panel and including third and fourth electrodes and black-varying particles of a core-shell structure between the third and fourth electrodes, wherein the black-varying particles are divided and disposed into the first, second and third pixel regions, wherein the color panel includes a reflection layer reflecting incident light.

18 Claims, 7 Drawing Sheets

REFLECTION TYPE DISPLAY DEVICE

CROSS-REFERENCE TO RELATED APPLICATION

The present application claims priority from and the benefit under 35 U.S.C. § 119(a) of Korean Patent Application No. 10-2015-0190360, filed in the Republic of Korea on Dec. 30, 2015, which is hereby incorporated by reference in its entirety.

BACKGROUND

Field of the Disclosure

The present invention relates to a display device, and more particularly, to a reflection type display device having high reflectance and a wide color gamut.

Description of the Background

Reflection type display devices use natural light or artificial light from the outside as a light source and display images by reflecting the light incident on a display area from the outside again and controlling transmittance of the light. The reflection type display devices do not require backlight units and have power consumption lower than that of transmission type display devices.

Various reflection type display devices such as electrophoretic display devices, electro-wetting display devices, and polymer dispersed liquid crystal display devices have been researched.

An electrophoretic display device includes white particles and black particles dispersed in a dielectric. At this time, the electrophoretic display device moves the white particles and the black particles, which are charged with different electric charges, to thereby display white and black. Accordingly, the white and black particles may be condensed, and it is hard to obtain a high reflectance and a high contrast ratio.

Moreover, when a color filter is used to display colors, incident light is absorbed and scattered by the color filter, reflected light has considerably lower intensity than the incident light. Therefore, the reflection type display device according to the related art cannot achieve a high reflectance and a wide color gamut.

Furthermore, since an electro-wetting display device and a polymer dispersed liquid crystal display device separately use a color filter and a reflector, incident light is absorbed and scattered by the color filter, and reflected light has considerably lower intensity than the incident light. Thus, there is a limitation in achieving a high reflectance and a wide color gamut.

Accordingly, a new reflection type display device has been required such that a high reflectance and a wide color gamut can be achieved when displaying colors.

SUMMARY

Accordingly, one aspect of the present disclosure is to provide a reflection type display device that substantially obviates one or more of the problems due to limitations and disadvantages of the related art.

An object of the present disclosure is to provide a reflection type display device that has a high reflectance and a wide color gamut.

Additional features and advantages of the disclosure will be set forth in the description which follows, and in part will be apparent from the description, or may be learned by practice of the disclosure. The objectives and other advantages of the invention will be realized and attained by the structure particularly pointed out in the written description and claims hereof as well as the appended drawings.

To achieve these and other advantages and in accordance with the purpose of the present disclosure, as embodied and broadly described herein, there is provided a reflection type display device including a color panel including first and second electrodes and color-varying particles of a core-shell structure between the first and second electrodes, wherein the color-varying particles are divided and disposed into first, second and third pixel regions; and a variable light-transmitting panel over the color panel and including third and fourth electrodes and black-varying particles of a core-shell structure between the third and fourth electrodes, wherein the black-varying particles are divided and disposed into the first, second and third pixel regions, wherein the color panel includes a reflection layer reflecting incident light.

Further scope of applicability of the present disclosure will become apparent from the detailed description given hereinafter. However, the detailed description and specific examples, while indicating aspects of the disclosure, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION OF THE EMBODIMENTS

Reference will now be made in detail to the aspects of the disclosure, examples of which are illustrated in the accompanying drawings. Words of 'on' and 'under' are used only for describing a direction in the following explanations and thus are not limited to 'directly on' and 'directly under'.

Figure 1:
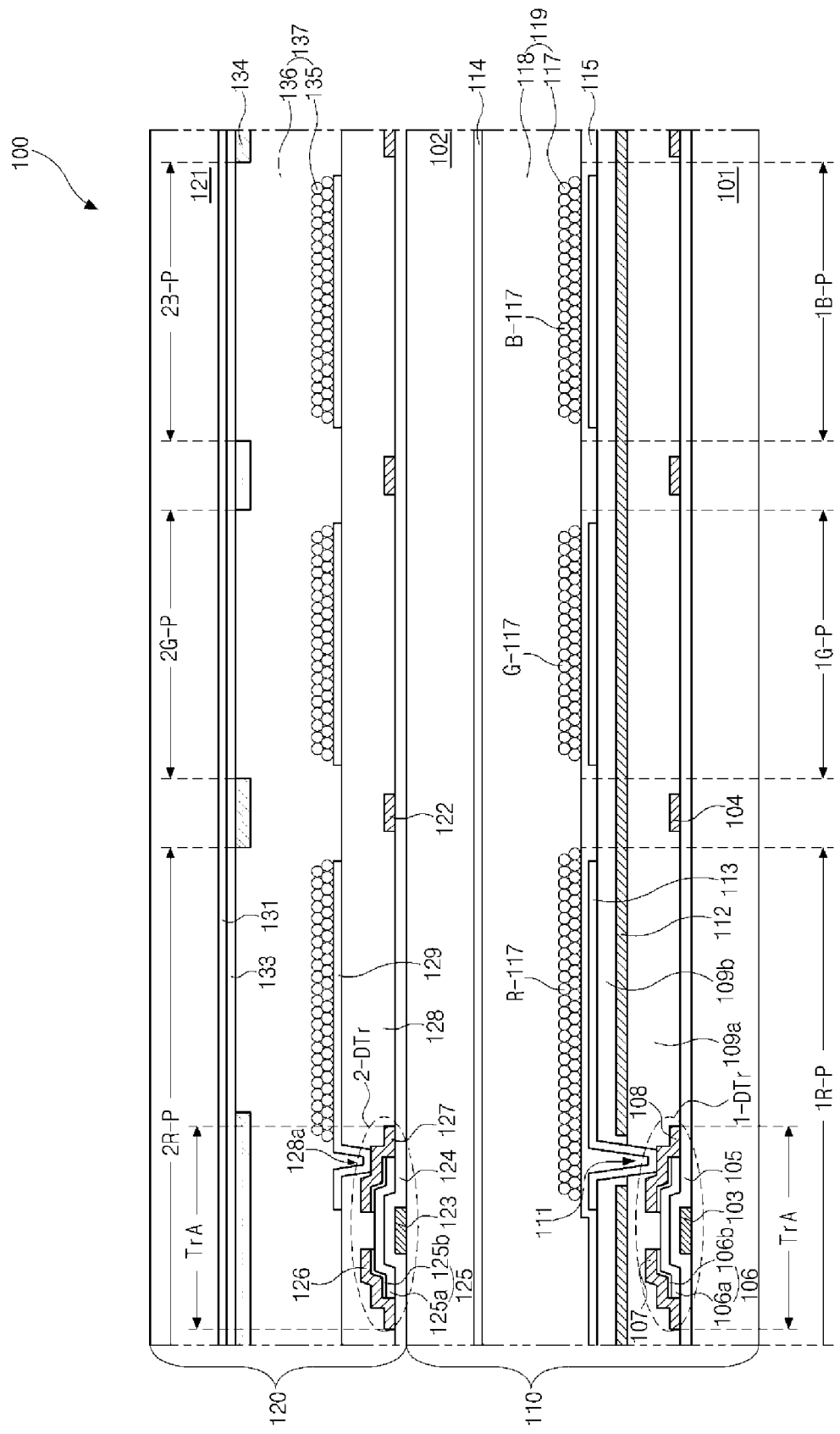
FIG. 1 is a view of schematically illustrating a reflection type display device according to an aspect of the present disclosure.
Figure 2A:
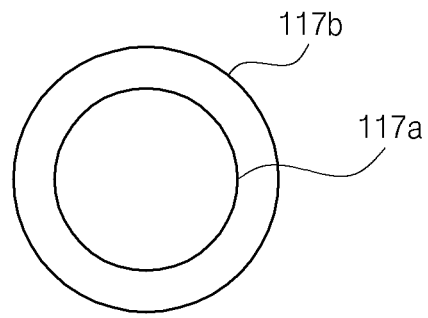
FIGS. 2A and 2B are views of schematically illustrating a color-varying particle of a core-shell structure in on/off states.
Figure 2B:
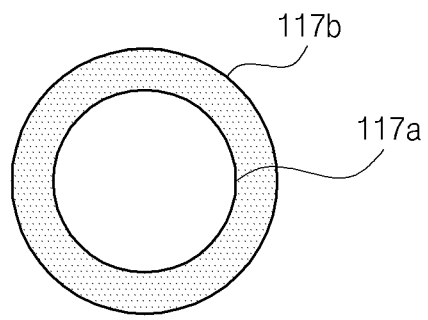
Figure 3A:
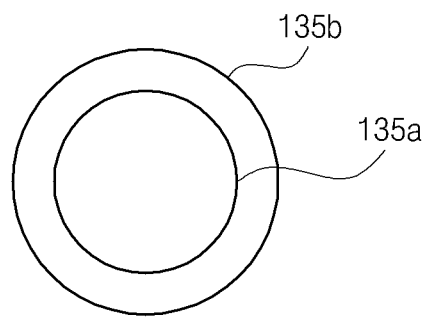
FIGS. 3A and 3B are views of schematically illustrating a black-varying particle of a core-shell structure in on/off states.
Figure 3B:
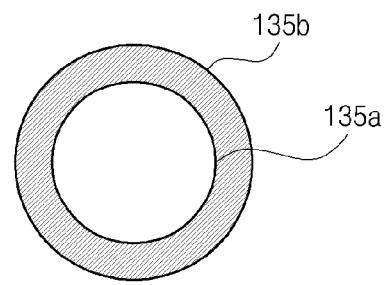

FIG. 1 is a view of schematically illustrating a reflection type display device according to an aspect of the present disclosure. FIGS. 2A and 2B are views of schematically illustrating a color-varying particle of a core-shell structure in on/off states. FIGS. 3A and 3B are views of schematically illustrating a black-varying particle of a core-shell structure in on/off states.

At this time, a first driving thin film transistor 1-DTr is formed in each first pixel region 1R-P, 1G-P and 1B-P, and a second driving thin film transistor 2-DTr is formed in each second pixel region 2R-P, 2G-P and 2B-P. However, for convenience of explanation, in the figure, it is shown that the first driving thin film transistor 1-DTr is disposed in the first pixel region 1R-P and the second driving thin film transistor 2-DTr is disposed in the second pixel region 2R-P. In addition, an area where the thin film transistors 1-DTr and 2-DTr are formed in each pixel region 1R-P, 1G-P, 1B-P, 2R-P, 2G-P, and 2B-P is defined as a switching area TrA.

In FIG. 1, the reflection type display device 100 according to an aspect of the present disclosure includes a color panel 110 implementing colors and a variable light-transmitting panel 120 functioning as a shutter.

More specifically, the color panel 110 includes first and second substrates 101 and 102 and a variable color layer 119 between the first and second substrates 101 and 102.

At this time, the first and second substrates 101 and 102 may be one of a glass substrate, a thin flexible substrate, and a polymer plastic substrate. Here, the flexible substrate may be formed of one of polyethersulfone (PES), polyethylene naphthalate (PEN), polyimide (PI), polyethylene terephthalate (PET), and polycarbonate (PC).

First gate lines (not shown), which are spaced apart from and parallel to a first direction, and first data lines 104, which are spaced apart from and parallel to a second direction, are formed on an inner surface of the first substrate 101. The first gate lines and the first data lines 104 cross each other and define a plurality of first pixel regions 1R-P, 1G-P and 1B-P.

A first thin film transistor 1-DTr is formed in a switching area TrA at a crossing portion of the first gate line and the first data line 104 in each first pixel region 1R-P, 1G-P and 1B-P. The first thin film transistor 1-DTr includes a first gate electrode 103, a first gate insulating layer 105, a first semiconductor layer 106, a first source electrode 107 and a first drain electrode 108. The first semiconductor layer 106 includes a first active layer 106a of intrinsic amorphous silicon and first ohmic contact layers 106b of impurity-doped amorphous silicon.

Here, the first thin film transistor 1-DTr is a bottom gate type including the first semiconductor layer 106 of intrinsic amorphous silicon and impurity-doped amorphous silicon. Alternatively, as a modified example, the first thin film transistor may be a top gate type including the first semiconductor layer of polycrystalline silicon.

A first passivation layer 109a is formed on the first data line 104, the first source electrode 107 and the first drain electrode 108.

A reflection layer 112 is formed on the first substrate 101 including the first passivation layer 109a thereon and functions as a reflector.

Since the reflection type display device 100 according to an aspect of the present disclosure uses the natural light or the artificial light from the outside as a light source, incident light from the outside is reflected by the reflection layer 112 while being scattered and diffused. Like this, by using the reflection layer 112, a reflective property may be improved and an image of high brightness can be displayed.

Here, the reflection layer 112 may be formed of one of silver (Ag), magnesium (Mg), aluminum (Al), platinum (Pt), palladium (Pd), gold (Au), nickel (Ni) and iridium (Ir) or their alloys including at least two materials mentioned above. Alternatively, the reflection layer 112 may include a first layer (not shown) of a metallic material and a second layer (not shown) of a transparent conductive material on the first layer. The metallic material may be one of silver (Ag), magnesium (Mg), aluminum (Al), platinum (Pt), palladium (Pd), gold (Au), nickel (Ni) and iridium (Ir) or their alloys including at least two materials mentioned above. The transparent conductive material may be one of indium tin oxide (ITO), indium zinc oxide (IZO) and zinc oxide (ZnO).

A second passivation layer 109b is formed on the reflection layer 112. The second passivation layer 109b is transparent and has a flat top surface.

A first electrode 113 is formed in each first pixel region 1R-P, 1G-P and 1B-P on the second passivation layer 109b.

The first electrode 113 is electrically connected to the first drain electrode 108 of the first thin film transistor 1-DTr through a first drain contact hole 111, which is formed in the first passivation layer 109a and the second passivation layer 109b. The first drain contact hole 111 may pass through a hole of the reflection layer 112. The first electrode 113 may directly contact the first drain electrode 108. Alternatively, if the reflection layer 112 is patterned and formed in each first pixel region 1R-P, 1G-P and 1B-P, the first drain contact hole 111 may be also formed in the reflection layer 112, and the reflection layer 112 may be connected to the first drain electrode 108.

The first electrode 113 selectively applies a voltage to color-varying particles 117 of a core-shell structure of the variable color layer 119 in the first pixel regions 1R-P, 1G-P and 1B-P.

Namely, the first electrode 113 is separately formed in each first pixel region 1R-P, 1G-P and 1B-P, such that each first pixel region 1R-P, 1G-P and 1B-P can be independently driven. The first electrode 113 patternizes and drives color-varying particles 117 of the core-shell structure of a variable color layer 119 to correspond to each first pixel region 1R-P, 1G-P and 1B-P.

The second substrate 102 is spaced apart from the first substrate 101, and a second electrode 114 is formed on a first surface of the second substrate 102 facing the first substrate 101. The second electrode is opposite to the first electrode 113 of the first substrate 101. The first substrate 101 and the second substrate 102 are attached to each other such that the variable color layer 119 is interposed between the first substrate 101 and the second substrate 102.

Each of the first and second electrodes 113 and 114 may be formed of a transparent conductive material such as indium tin oxide (ITO), antimony tin oxide (ATO) and indium zinc oxide (IZO) or may be formed of a transparent conductive polymer material. Each of the first and second electrodes 113 and 114 may have a thickness of several thousands angstrom (A).

The variable color layer 119 includes the color-varying particles 117 of the core-shell structure widely dispersed in a first electrolyte 118. The color of the color-varying particles 117 of the core-shell structure is changed by an electrical oxidation-reduction reaction according to an applied voltage, and the color-varying particles 117 have a changeable light-transmittance property.

At this time, the first electrolyte 118 of the variable color layer 119, in which the color-varying particles 117 of the core-shell structure are dispersed, is a solid electrolyte of a solid phase. As such, the variable color layer 119 has a flexible property, a total thickness of the variable color layer 119 decreases while an attachment property between the first and second substrates 101 and 102 increases.

The first solid electrolyte 118 functions as a storage area of ions carrying charges. The first solid electrolyte 118 smoothly supplies charges necessary for the color-varying particles 117 of the core-shell structure.

The color-varying particles 117 of the core-shell structure can be driven by relatively low voltage due to the first solid electrolyte 118.

When the first solid electrolyte 118 is used as an electrolyte where the color-varying particles 117 of the core-shell structure are dispersed, a fixing member such as an additional seal pattern for preventing the variable color layer 119 from being leaked can be omitted.

At this time, a first counter material layer 115 may be formed between the first electrode 113 and the first solid electrolyte 118. The first counter material layer 115 controls charge valance in the variable color layer 119. The first counter material layer 115 controls charge quantity of electric charges, which move in the color-varying particles 117 of the core-shell structure and the first solid electrolyte 118. Therefore, the first counter material layer 115 improves charge stability in the variable color layer 119.

The color-varying particles 117 of the core-shell structure transmit light or reflect light to produce color by being transparent or being colored.

Referring to FIG. 2A and FIG. 2B, each color-varying particle 117 of the core-shell structure of the variable color layer 119 includes a core 117a and a shell 117b surrounding the core 117a. The core 117a has a relatively high transmittance. The shell 117b has an electrochromic property by transmitting or reflecting light according to an electric signal.

The oxidation-reduction reaction occurs due to ions or electrons according to a voltage applied to the shell 117b, and thus the color of the color-varying particle 117 of the core-shell structure is reversibly changed.

That is, the shell 117b of the color-varying particle 117 is formed of a material changed from a transparent state to a colored state or changed from a colored state to a transparent state. The color-varying particle 117 has a reflective property due to the colored state of the shell 117b and a transmissive property due to the transparent state of the shell 117b.

As shown in FIG. 2A, when a voltage is not applied to the first and second electrodes 113 and 114, that is, in an off state, both the core 117a and the shell 117b of the color-varying particle 117 of the variable color layer 119 are transparent. As shown in FIG. 2B, when a voltage is applied to the first and second electrodes 113 and 114, that is, in an on state, the shell 117b of the color-varying particle 117 of the variable color layer 119 is changed and colored.

For example, the shell 117b is changed into red.

The core 117a may be formed of a transparent conductive material such that injection of electrons from an electrode can be increased and a response time of the color-varying particle 117 of the core-shell structure can be improved. For example, the core 117a may be formed of indium tin oxide (ITO) or indium zinc oxide (IZO).

In addition, the core 117a may have a nanocrystal size of about 3 to 10 nm, and the color-varying particle 117 may have a nanocrystal size of about 10 to 300 nm in total.

Here, the color-varying particle 117 of the core-shell structure of FIGS. 2A and 2B may be a red color-varying particle, for example. The color-varying particles 117 of the core-shell structure according to an aspect of the present disclosure include a green color-varying particle in which the shell 117b is changed into green and a blue color-varying particle in which the shell 117b is changed into blue.

Namely, the variable color layer 119 is divided into the first pixel regions 1R-P, 1G-P and 1B-P. The red color-varying particles R-117, the green color-varying particles G-117 and the blue color-varying particles B-117 are dispersed and disposed in the first solid electrolyte 118 corresponding to the respective first pixel regions 1R-P, 1G-P and 1B-P.

The variable light-transmitting panel 120 is disposed over the color panel 110. The variable light-transmitting panel 120 includes a third substrate 121 facing the second substrate 102 of the color panel 110 and a variable light-blocking layer 137 between the second substrate 102 and the third substrate 121. The second substrate 102 and the third substrate 121 are attached to each other. The second substrate 102 may be included in the variable light-transmitting panel 120. The color panel 110 and the variable light-transmitting panel 120 may share the second substrate 102.

At this time, the third substrate 121 may be a glass substrate, a thin flexible substrate or a polymer plastic substrate. Here, the flexible substrate may be formed of one of polyethersulfone (PES), polyethylene naphthalate (PEN), polyimide (PI), polyethylene terephthalate (PET), and polycarbonate (PC).

Second gate lines (not shown), which are spaced apart from and parallel to a first direction, and second data lines 122, which are spaced apart from and parallel to a second direction, are formed on the second surface of the second substrate 102 opposite to the first surface. The second gate lines and the second data lines 122 cross each other and define a plurality of second pixel regions 2R-P, 2G-P and 2B-P.

A second thin film transistor 2-DTr is formed in a switching area TrA at a crossing portion of the second gate line and the second data line 122 in each second pixel region 2R-P, 2G-P and 2B-P. The second thin film transistor 2-DTr includes a second gate electrode 123, a second gate insulating layer 124, a second semiconductor layer 125, a second source electrode 126 and a second drain electrode 127. The second semiconductor layer 125 includes a second active layer 125a of intrinsic amorphous silicon and second ohmic contact layers 125b of impurity-doped amorphous silicon.

A third passivation layer 128 is formed on the second data line 122, the second source electrode 126 and the second drain electrode 127.

A third electrode 129 is formed in each second pixel region 2R-P, 2G-P and 2B-P on the third passivation layer 128.

At this time, the third electrode 129 is electrically connected to the second drain electrode 127 of the second thin film transistor 2-DTr through a second drain contact hole 128a, which is formed in the third passivation layer 128. The third electrode 129 may directly contact the second drain electrode 127.

The third electrode 129 selectively applies a voltage to black-varying particles 135 of a core-shell structure of the variable light-blocking layer 137.

Namely, the third electrode 129 is separately formed in each second pixel region 2R-P, 2G-P and 2B-P, such that each second pixel region 2R-P, 2G-P and 2B-P can be independently driven. The third electrode 129 patternizes and drives the black-varying particles 135 of the core-shell structure of the variable light-blocking layer 137 to correspond to each second pixel region 2R-P, 2G-P and 2B-P.

A black matrix 134 is formed on an inner surface of the third substrate 121 facing the second surface of the second substrate 102. The black matrix 134 corresponds to the second thin film transistors 2-DTr, the gate lines and the data lines 122 and also corresponds to a non-display area in which an image is not displayed.

The black matrix 134 blocks light reflected in the second pixel regions 2R-P, 2G-P and 2B-P. In addition, the black matrix 134 covers the second thin film transistors 2-DTr, the gate lines, the data lines 122 and the non-display area and prevents light from being leaked.

A fourth electrode 131 is formed on the inner surface of the third substrate 121. The fourth electrode 131 faces the third electrodes 129 of the second substrate 102. The variable light-blocking layer 137 is disposed between the second substrate 102 and the third substrate 121. The fourth electrode 131 may be disposed between the black matrix 134 and the third substrate 121.

The third and fourth electrodes 129 and 131 are formed of a transparent conductive material such as indium tin oxide (ITO), antimony tin oxide (ATO) and indium zinc oxide (IZO) or may be formed of a transparent conductive polymer material. Each of the third and fourth electrodes 129 and 131 may have a thickness of several thousands angstrom (Å).

The variable light-blocking layer 137 includes the black-varying particles 135 of the core-shell structure widely dispersed in a second solid electrolyte 136. The color of the black-varying particles 135 of the core-shell structure is changed by an electrical oxidation-reduction reaction according to an applied voltage, and the black-varying particles 135 have a changeable light-transmittance property.

The second solid electrolyte 136 functions as a storage area of ions carrying charges. The second solid electrolyte 136 smoothly supplies charges necessary for the black-varying particles 135 of the core-shell structure.

The black-varying particles 135 of the core-shell structure can be driven by a relatively low voltage due to the second solid electrolyte 136.

A second counter material layer 133 may be formed between the fourth electrode 131 and the second solid electrolyte 136. The second counter material layer 133 controls charge valance in the variable light-blocking layer 137. The second counter material layer 133 controls charge quantity of electric charges, which move in the black-varying particles 135 of the core-shell structure and the second solid electrolyte 136. Therefore, the second counter material layer 133 can improve charge stability in the variable light-blocking layer 137.

The black-varying particles 135 of the core-shell structure transmit light or absorb and block light by being transparent or being black.

Referring to FIG. 3A and FIG. 3B, each black-varying particle 135 of the core-shell structure of the variable light-blocking layer 137 includes a core 135a and a shell 135b surrounding the core 135a. The core 135a has a relatively high transmittance. The shell 135b has an electrochromic property by transmitting or blocking light according to an electric signal.

The oxidation-reduction reaction occurs due to ions or electrons according to a voltage applied to the shell 135b, and thus the color of the black-varying particle 135 of the core-shell structure is reversibly changed.

That is, the shell 135b of the black-varying particle 135 is formed of a material changed from a transparent state to a black state or changed from a black state to a transparent state. The black-varying particle 135 has a light-blocking property due to the black state of the shell 135b and a transmissive property due to the transparent state of the shell 135b.

As shown in FIG. 3A, when a voltage is not applied to the third and fourth electrodes 129 and 131, that is, in an off state, both the core 135a and the shell 135b of the black-varying particle 135 of the variable light-blocking layer 137 are transparent. As shown in FIG. 3B, when a voltage is applied to the third and fourth electrodes 129 and 131, that is, in an on state, the shell 135b of the black-varying particle 135 of the variable light-blocking layer 137 is changed into black.

The core 135a may be formed of a transparent conductive material such that injection of electrons from an electrode can be increased and a response time of the black-varying particle 135 of the core-shell structure can be improved. For example, the core 135a may be formed of indium tin oxide (ITO) or indium zinc oxide (IZO).

In addition, the core 135a may have a nanocrystal size of about 3 to 10 nm, and the black-varying particle 135 may have a nanocrystal size of about 10 to 300 nm in total.

Here, the reflection type display device 100 including the color panel 110 and the variable light-transmitting panel 120 can produce black and white and red (R), green (G) and blue (B) using red (R), green (G) and blue (B) pixel regions 1R-P, 1G-P, 1B-P, 2R-P, 2G-P and 2B-P.

In addition, light loss can be minimized, and a wide color gamut and a high reflectance can be obtained. Moreover, relatively a fast response time can be achieved.

Figure 4A:
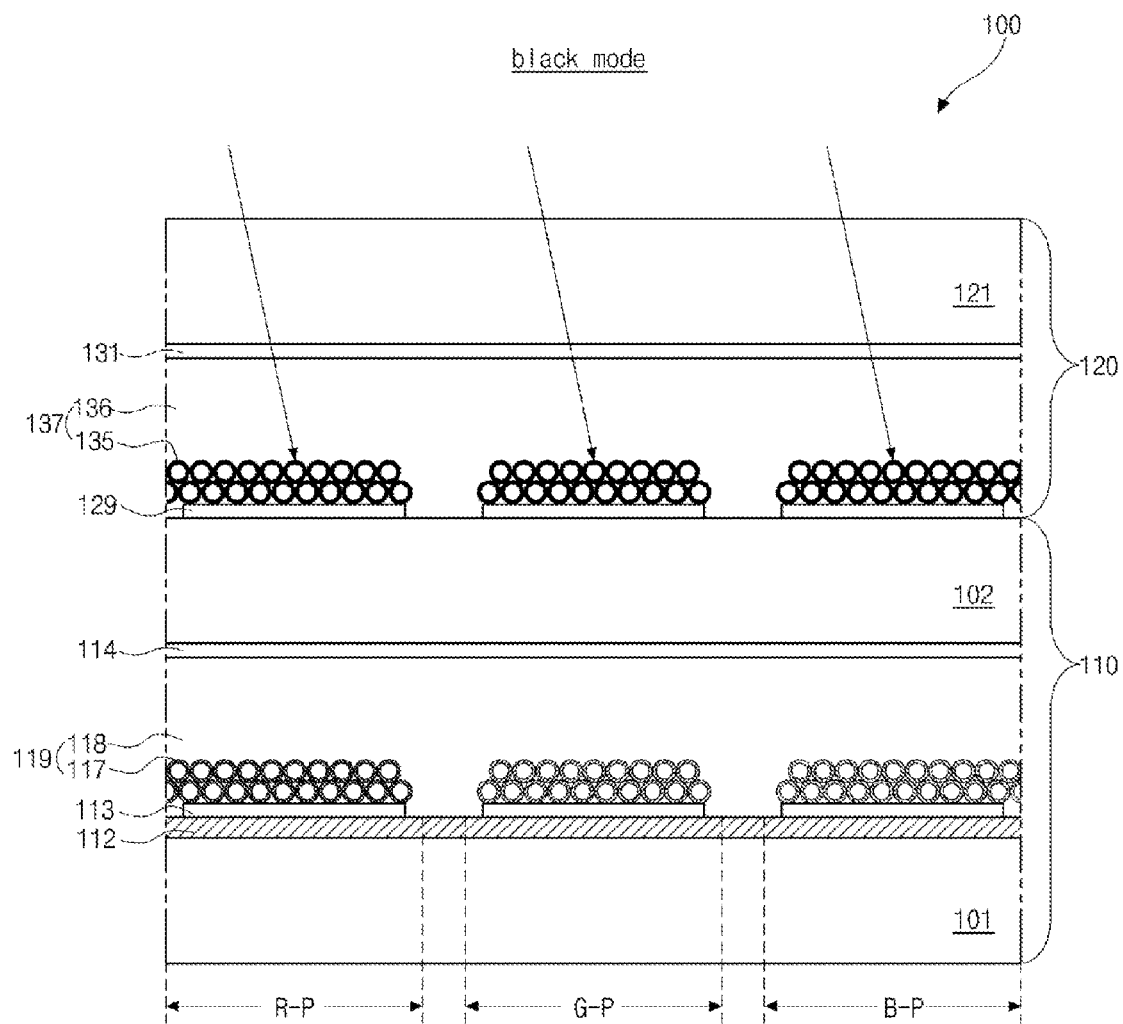
FIGS. 4A and 4B are schematic views of a reflection type display device in black and white modes according to aspects of the present disclosure.
Figure 4B:
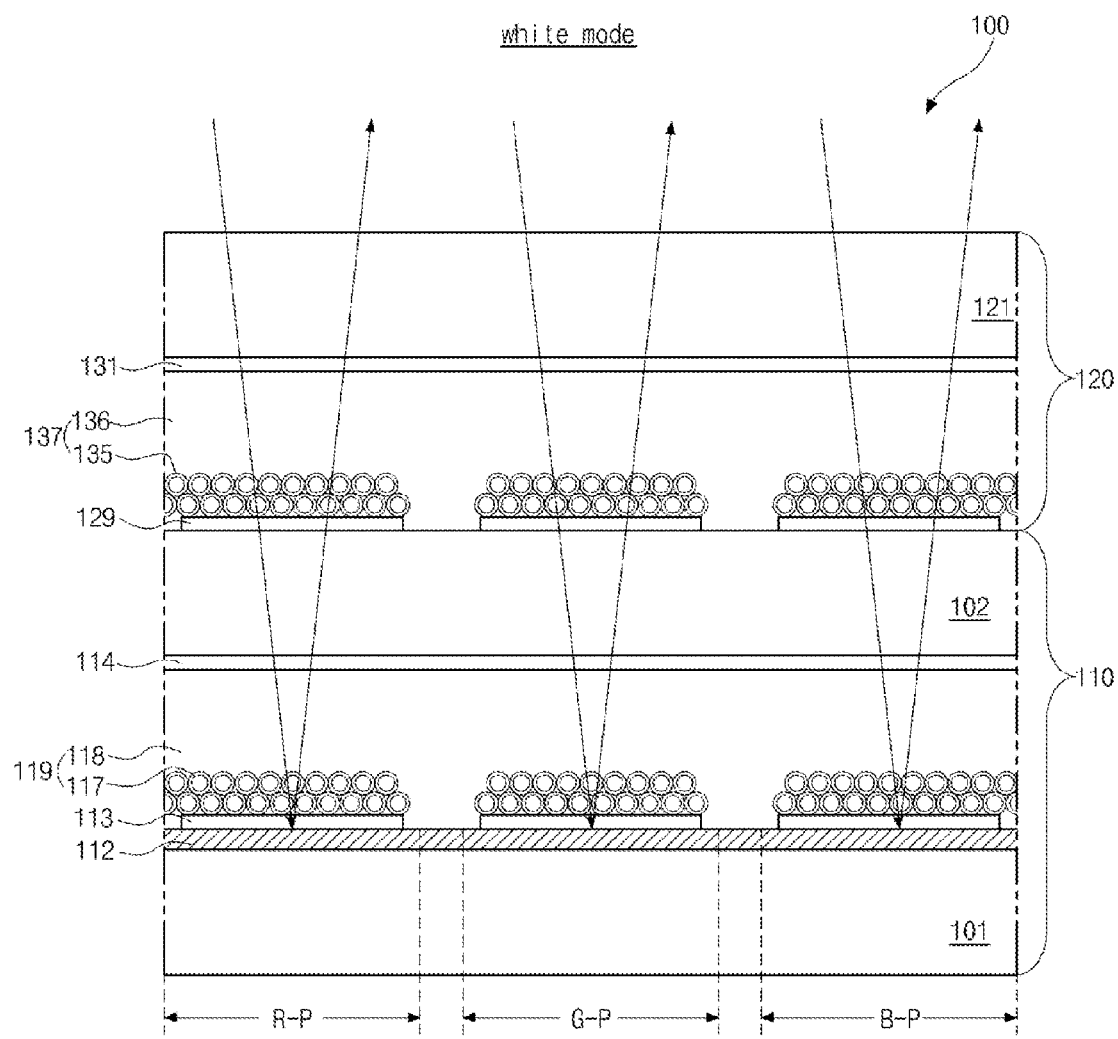
Figure 4C:
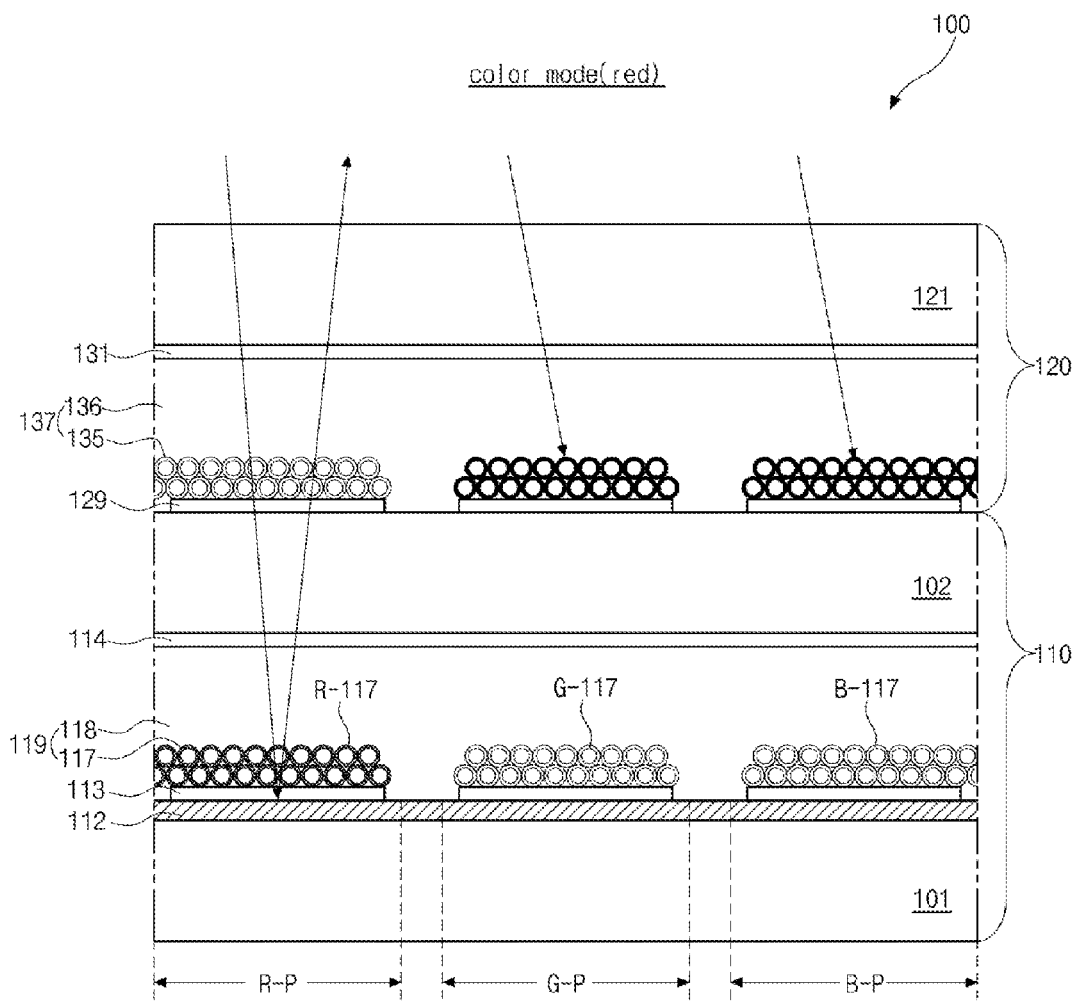
FIGS. 4C to 4E are schematic views of the reflection type display device in color modes according to aspects of the present disclosure.
Figure 4D:
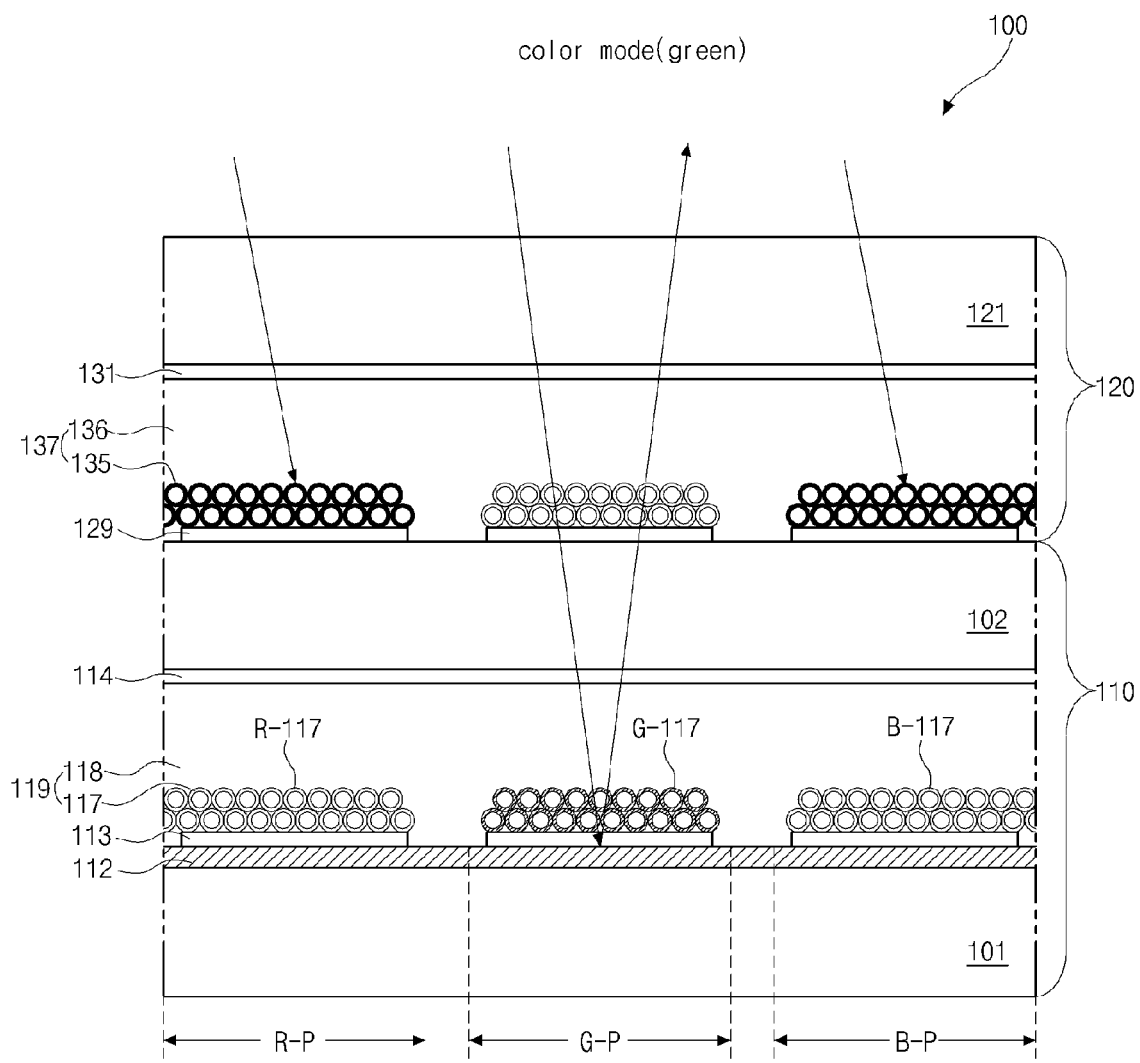
Figure 4E:
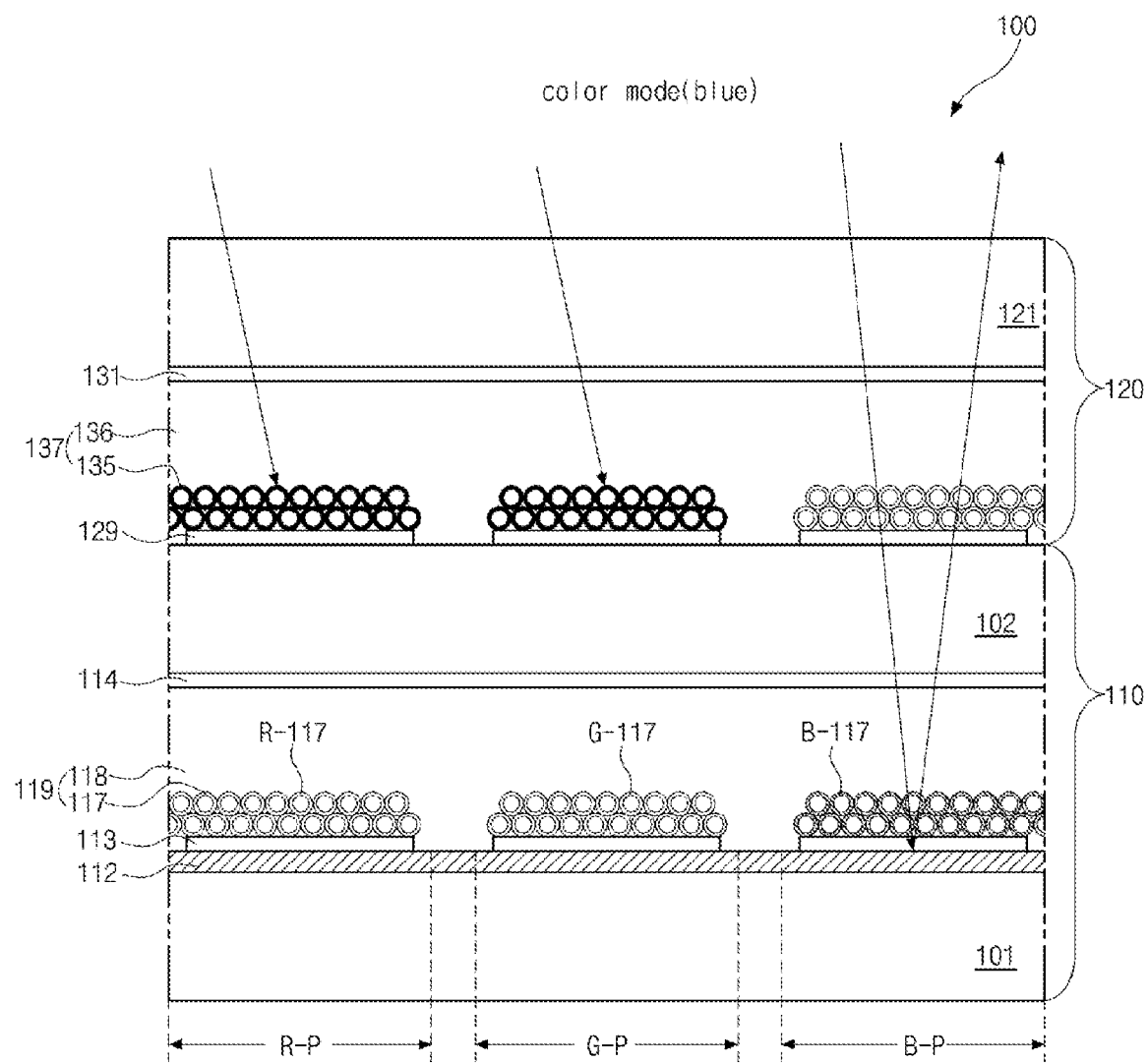

FIGS. 4A and 4B are schematic views of a reflection type display device in black and white modes according to aspect of the present disclosure, and FIGS. 4C to 4E are schematic views of a reflection type display device in color modes according to an aspect of the present disclosure.

In FIG. 4A, when the reflection type display device 100 is in the black mode, voltages are applied to the third and fourth electrodes 129 and 131, and an electrical signal is applied to the variable light-blocking layer 137.

Therefore, the shell 135b of FIG. 3B of each black-varying particle 135 of the core-shell structure in the variable light-blocking layer 137 of the variable light-transmitting panel 120 is black when the electrical signal is applied, and the variable light-blocking layer 137 forms a light-blocking layer due to the black-varying particles 135 of the core-shell structure.

At this time, if the light from the outside such as the natural light or the artificial light is incident on the reflection type display device 100, the light is absorbed and blocked by the light-blocking layer due to the black-varying particles 135 of the core-shell structure, and the reflection type display device 100 is driven in the black mode.

On the other hand, in FIG. 4B, when the reflection type display device 100 is in the white mode, the variable light-transmitting panel 120 and the color panel 110 are switched off, and the black-varying particles 135 of the core-shell structure of the variable light-transmitting panel 120 and the color-varying particles 117 of the core-shell structure of the color panel 110 are transparent.

Accordingly, if the light from the outside such as the natural light or the artificial light is incident on the reflection type display device 100, the light is transmitted by the black-varying particles 135 of the core-shell structure and the color-varying particles 117 of the core-shell structure and then is reflected by the reflection layer 112.

The light reflected by the reflection layer 112 is outputted to the outside of the reflection type display device 100, and the reflection type display device 100 is driven in the white mode.

In FIGS. 4C to 4E, when the reflection type display device 100 is in the color mode, the variable light-transmitting panel 120 is switched off, and the color panel 110 is switched on. Namely, voltages are applied to the first and second electrodes 113 and 114 of the color panel 110, and the electrical signal is applied to the variable color layer 119.

Therefore, the color-varying particles 117 of the core-shell structure of the variable color layer 119 of the color panel 110 are divided into the pixel regions R-P, G-P and B-P, and the shells 117b of FIG. 2B of the color-varying particles 117 of the core-shell structure in the pixel regions R-P, G-P and B-P are changed into red, green and blue due to the electrical signal.

At this time, if the light from the outside such as the natural light or the artificial light is incident on the reflection type display device 100, the light is reflected by the reflection layer 112 and is outputted to the outside, to thereby produce red, green and blue by passing through the shells 117b of FIG. 2B of the color-varying particles 117 of the core-shell structure.

Here, when the reflection type display device 100 displays red, as shown in FIG. 4C, the variable light-transmitting panel 120 corresponding to the red pixel region R-P is switched off, and the color panel 110 corresponding to the red pixel region R-P is switched on. When the light from the outside is reflected by the reflection layer 112 and is outputted to the outside, the light passes through the red-varying particles R-117 of the core-shell structure in the red pixel region R-P, and thus red is outputted.

At this time, the variable light-transmitting panel 120 corresponding to the blue pixel region B-P including the blue-varying particles B-117 of the core-shell structure and the green pixel region G-P including the green-varying particles G-117 of the core-shell structure are switched on. Voltages are applied to the third and fourth electrodes 129 and 131, and the variable light-blocking layer 137 forms a light-blocking layer due to the black-varying particles 135 of the core-shell structure of the variable light-blocking layer 137 in the blue pixel region B-P and the green pixel region G-P.

Accordingly, the reflection type display device 100 displays red.

Moreover, as shown in FIG. 4D, when the reflection type display device 100 displays green, voltages are applied to the third and fourth electrodes 129 and 131 of the variable light-transmitting panel 120 in the red pixel region R-P and the blue pixel region B-P, and the variable light-blocking layer 137 forms a light-blocking layer in the red pixel region R-P and the blue pixel region B-P. The variable light-transmitting panel 120 corresponding to the green pixel region G-P is switched off, and the color panel 110 corresponding to the green pixel region G-P is switched on. When the light from the outside is reflected by the reflection layer 112 and is outputted to the outside, the light passes through the green-varying particles G-117 of the core-shell structure in the green pixel region G-P, and thus green is outputted.

Furthermore, as shown in FIG. 4E, when the reflection type display device 100 displays blue, voltages are applied to the third and fourth electrodes 129 and 131 of the variable light-transmitting panel 120 in the red pixel region R-P and the green pixel region G-P, and the variable light-blocking layer 137 forms a light-blocking layer in the red pixel region R-P and the green pixel region G-P. The variable light-transmitting panel 120 corresponding to the blue pixel region B-P is switched off, and the color panel 110 corresponding to the blue pixel region B-P is switched on. When the light from the outside is reflected by the reflection layer 112 and is outputted to the outside, the light passes through the blue-varying particles B-117 of the core-shell structure in the blue pixel region B-P, and thus blue is outputted.

The reflection type display device 100 according to an aspect of the present disclosure displays images using the light from the outside through the variable light-transmitting panel 120 including the black-varying particles 135 of the core-shell structure, which are reversibly changed from the transparent state into the black state according to the electrical signal, and the color panel 110 including the color-varying particles 117 of the core-shell structure, which are reversibly changed from the transparent state into the red, green or blue state according to the electrical signal. Therefore, black and white and red, green and blue colors can be produced by the red, green and blue pixel regions R-P, G-P and B-P.

In addition, since the color filter is not necessary, light is not absorbed and scattered by the color filter, and the light loss is minimized.

Accordingly, when the color is produced, a wide color gamut and a high reflectance can be obtained, and a relatively fast response time can be achieved due to the black-varying particles 135 of the core-shell structure and the color-varying particles 117 of the core-shell structure, which have the changed colors depending on the applied voltage.

Hereinafter, experimental examples and comparative examples of the present disclosure will be explained in more detail. The present disclosure is only explained through the experimental examples and is not limited to these.

Production Example 1: Formation of Shell Material of Black-Varying Particle of Core-Shell Structure In a three neck flask under a nitrogen atmosphere, 15.6 g (0.1 mol) of bipyridine and 24.5 g (0.1 mol) of bromomethylphosphonate are added to a solution including a 50:50 mix of methanol and water. The mixture was refluxed at 80° C. for 12 hours, the solvent is distilled, and the mixture is purified such that a white solid matter was obtained.

40.0 g of the white solid matter and 35.6 g (0.1 mol) of 1,3,5-tribromobenzene are injected into a solvent including an 80:20 mix of ethanol and toluene, and the mixture is reacted for 3 days. Then, the mixture is purified such that a light yellow material is obtained.

70 g of the light yellow material is injected to 7.1 g (0.1 mol) of 3-Oxo-3-(4-phenoxyphenyl)-propionic acid methyl ester, 31.2 g (0.2 mol) of bipyridine, and 300 g of methanol, and the mixture is reacted at 80° C. for 12 hours. Then, the mixture is first dealt with by 38 wt % of HCl aqueous solution, and impurities except for a target compound are removed by recrystallization.

Accordingly, the shell of the black-varying particle of the core-shell structure can be formed.

Production Example 2: Formation of Shell Material of Red-Varying Particle of Core-Shell Structure In a three neck flask under a nitrogen atmosphere, 15.6 g (0.1 mol) of bipyridine and 24.5 g (0.1 mol) of bromomethylphosphonate are added to a solution including a 50:50 mix of methanol and water. The mixture is refluxed at 80° C. for 12 hours, the solvent is distilled, and the mixture is purified such that a white solid matter is obtained 40.0 g of the white solid matter and benzylbromide at a 1:1 molar ratio are injected into a solvent including a 50:50 mix of ethanol and toluene, and the mixture is reacted for 1 day. Then, the mixture is purified such that a light yellow material is obtained.

Accordingly, the shell of the red-varying particle of the core-shell structure can be formed.

Production Example 3: Formation of Shell Material of Blue-Varying Particle of Core-Shell Structure The shell material of blue-varying particle of core-shell structure can be synthesized the same as the production example 2 except for use of heptylbromide instead of benzylbromide.

Accordingly, the shell of the blue-varying particle of the core-shell structure can be formed.

Production Example 4: Formation of Shell Material of Green-Varying Particle of Core-Shell Structure The shell material of green-varying particle of core-shell structure can be synthesized the same as the production example 2 except for use of 3-Oxo-3-(4-phenoxyphenyl)-propionic acid methyl ester instead of benzylbromide.

Accordingly, the shell of the green-varying particle of the core-shell structure can be formed.

Production Example 5: Formation of Reflection Layer 40 g of $TiO_2$ power, 80 g of ethanol, 10 g of acetylacetone, 165 g of 0.1 mm beads are injected into a wide-mouth bottle (300 mL). The mixture is dispersed by a ball mill moving at 600 rpm for 6 hours such that a particle solution is manufactured.

Production Example 6: Manufacturing of Solution for Black-Varying Particle of Core-Shell Structure 2.0 g of the shell material formed in the production example 1 is dissolved into 20 g of methanol. The mixture is stirred by ultrasonic waves at a temperature of 50° C. for 3 hours such that a transparent solution can be obtained. The same processes are repeated to obtain transparent solutions.

In addition, 50 g of ITO powder (first particle size>15 nm, Solvay), 3.0 g of acetone, 0.05 g of BYK160 and 120 g of isopropyl alcohol are put in a wide-mouth bottle (250 mL) and are stirred for 1 hour. Then, 50 g of the transparent solution and 200 g of 0.1 mm zirconia beads are added, and the mixture is sealed. After that, the mixture is dispersed by a ball mill moving at 600 rpm for 24 hours such that the solution for the black-varying particle of the core-shell structure can be manufactured.

Production Example 7: Manufacturing of Solution for Red-Varying Particle of Core-Shell Structure The solution for the red-varying particle of the core-shell structure is manufactured by the same method as the production example 6 except for use of the shell material formed in the production example 2 instead of the shell material formed in the production example 1.

Production Example 8: Manufacturing of Solution for Blue-Varying Particle of Core-Shell Structure The solution for the blue-varying particle of the core-shell structure is manufactured by the same method as the production example 6 except for use of the shell material formed in the production example 3 instead of the shell material formed in the production example 1.

Production Example 9: Manufacturing of Solution for Green-Varying Particle of Core-Shell Structure The solution for the green-varying particle of the core-shell structure is manufactured by the same method as the production example 6 except for use of the shell material formed in the production example 4 instead of the shell material formed in the production example 1.

Production Example 10: Manufacturing of Counter Material Layer 30 g of vinyl triphenylamine and 30 g of chlorobenzene are put in a flask equipped with an agitator, and the mixture is stirred and dissolved. After the temperature is raised by 60° C., an initiator for radical polymerization is added to the mixture at a speed of 0.05 g/min, and the mixture is reacted for 23 hours such that triphenyl amine polymer with a molecular weight of 9500 can be obtained.

The synthesized polymer is dissolved in dichlorobenzene and is spin-coated on a substrate at 1000 rpm, thereby manufacturing the counter material layer.

Production Example 11: Manufacturing of Solid Electrolyte 300 g of acetonitrile, 10.0 g of polyethylene oxide (molecular weight 600K), 15.0 g of siloxane with added 0.8 mol of ethylene oxide and ethyleneoxy are put in a flask equipped with an agitator, and the mixture is stirred. Then, 1.77 g of LiTFSi, 0.5 g of S104 (Air Products and Chemicals, Inc.) as an additive, and 0.05 g of OXE01 (BASF) as a photo initiator are added to the mixture and stirred at a temperature of 50° C. for 6 hours such that a transparent polymer electrolyte solution can be manufactured.

The manufactured solid electrolyte is coated on electrodes, which are separated from each other with a parallel gap of 1 mm therebetween, and the solvent was dried. Then, impedance was measured by irradiating 0.1 $J/cm^2$ of UV, and ion conductance was $5.4 \times 10^{-5}$ S/cm.

Production Example 12: Manufacturing of Variable Light-Transmitting Panel and Color Panel The solution for the black-varying particle of the core-shell structure manufactured in the production example 6 is coated on a first side of a both-sided ITO PET film with a sheet resistance of 40 Ω/sq such that a final thickness is 4 μm, and is dried at a temperature of 80° C. for 20 minutes, to thereby form the black-varying particles of the variable light-blocking layer. Then, the solution for the red-varying particle of the core-shell structure is coated on a second side of the both-sided ITO PET film and is patterned, and the same processes for green and blue are performed to thereby form the color-varying particles of the variable color layer.

After the solid electrolyte manufactured in the production example 11 is dried and/or cured, the solid electrolyte is coated on the black-varying particles of the variable light-blocking layer such that a thickness was 100 μm, and the electrolyte layer is hardened by irradiating 0.2 $J/cm^2$ of UV. The solid electrolyte is contacted and laminated with the film on which the counter material layer formed in the production example 10 is disposed at a temperature of 40° C. to thereby form the variable light-transmitting panel. The solid electrolyte and the counter material layer are formed on the color-varying particles of the variable color layer by the same method to thereby form the color panel.

Production Example 13: Measuring Optical Characteristics of Reflection Type Display Device In the variable light-transmitting panel and the color panel, the reflection layer manufactured in the production example 5 is laminated at the rear side of the color panel, and the reflection type display device is fabricated. Voltages of +1.2 V and −1.2 V are applied to the display device and 50 aging steps are performed every ten seconds. Then, reflectance and color properties of each pixel region are measured by using DMS803 (spectrophotometer of Konica Minolta, Inc.), and thus the color gamut of the display device is measured.

Comparative Example 1: Manufacturing of Variable Light-Transmitting Panel

In the constitution of the variable light-transmitting panel and the color panel manufactured in the production example 12, a variable light-transmitting panel is manufactured by the same method as the production example 12.

Comparative Example 2: Manufacturing of Reflection Type Display Device

On the variable light-transmitting panel manufactured in the comparative example 1, white, red, green and blue reflective bodies are formed and separated by the pixel regions with a quad structure, and the reflection layer is laminated to the variable light-transmitting panel to thereby manufacture a reflection type display device. Then, reflectance and color properties of each pixel region are measured by using DMS803 (spectrophotometer of Konica Minolta, Inc.), and thus the color gamut of the display device is measured.

The following table 1 shows results of the color properties and the brightness of the reflection type display device according to the comparative example 2.

TABLE 1

| color | | white | red | yellow | green | cyan | blue | magenta | black | color gamut |
|---|---|---|---|---|---|---|---|---|---|---|
| coordinate | x | 0.342 | 0.421 | 0.371 | 0.308 | 0.280 | 0.252 | 0.344 | 0.299 | 8.75% |
| | y | 0.381 | 0.325 | 0.405 | 0.430 | 0.382 | 0.289 | 0.305 | 0.312 | |
| brightness | Y | 31.7% | 7.4% | 17.3% | 13.4% | 16.9% | 7.0% | 11.0% | 3.5% | |

The following table 2 shows results of the color properties and the brightness of the reflection type display device according to an aspect of the present disclosure according to the production example 13.

TABLE 2

| color | | white | red | yellow | green | cyan | blue | magenta | black | color gamut |
|---|---|---|---|---|---|---|---|---|---|---|
| coordinate | x | 0.352 | 0.439 | 0.376 | 0.309 | 0.278 | 0.246 | 0.348 | 0.299 | 10.56% |
| | y | 0.389 | 0.327 | 0.412 | 0.442 | 0.387 | 0.286 | 0.304 | 0.312 | |
| brightness | Y | 52.3% | 8.1% | 20.5% | 15.6% | 20.0% | 7.7% | 12.6% | 3.3% | |

By comparing table 1 and table 2, the reflection type display device according to an aspect of the present disclosure has higher brightness than the reflection type display device of the production example 2.

Here, the brightness of the reflection type display device means the reflectance. Thus, the reflection type display device according to an aspect of the present disclosure also has higher reflectance than the reflection type display device of the production example 2.

In addition, the color gamut of the reflection type display device according to an aspect of the present disclosure is wider than that of the reflection type display device of the production example 2.

Namely, the reflection type display device according to an aspect of the present disclosure displays images using the light from the outside through the variable light-transmitting panel including the black-varying particles of the core-shell structure, which are reversibly changed from the transparent state into the black state according to the electrical signal, and the color panel including the color-varying particles of the core-shell structure, which are reversibly changed from the transparent state into the red, green or blue state according to the electrical signal. Therefore, black and white and red, green and blue colors can be produced by the red, green and blue pixel regions.

In addition, since the color filter is not necessary, light is not absorbed and scattered by the color filter, and the light loss is minimized.

Accordingly, when the colors are produced, a wide color gamut and a high reflectance can be obtained, and a relatively fast response time can be achieved due to the black-varying particles of the core-shell structure and the color-varying particles of the core-shell structure, which have the changed colors depending on the applied voltage.

It will be apparent to those skilled in the art that various modifications and variations can be made in a display device of the present disclosure without departing from the sprit or scope of the disclosure. Thus, it is intended that the present disclosure covers the modifications and variations of this disclosure provided they come within the scope of the appended claims and their equivalents.

What is claimed is:

1. A reflection type display device, comprising:
a color panel having first and second electrodes and color-varying particles of a core-shell structure between the first and second electrodes, wherein the color-varying particles are respectively disposed at first, second and third pixel regions; and
a variable light-transmitting panel over the color panel and having third and fourth electrodes and black-varying particles of a core-shell structure between the third and fourth electrodes, wherein the black-varying particles are respectively disposed at the first, second and third pixel regions.

2. The display device of claim 1, wherein the color panel has a reflection layer reflecting incident light.

3. The display device of claim 2, further comprising a first passivation layer disposed on the first thin film transistor, wherein the reflection layer is disposed on the first passivation layer substantially all over the first substrate.

4. The display device of claim 3, further comprising second passivation layer disposed on the reflection layer, wherein the first electrode is disposed on the second passivation layer and is connected to a drain electrode of the first thin film transistor through a first drain contact hole in the first passivation layer, the reflection layer and the second passivation layer.

5. The display device of claim 1, wherein the color panel comprises:
first and second substrate facing each other;
a first thin film transistor on the first substrate and connected to the first electrode; and
a second electrode on a first surface of the second substrate and opposite to the first electrode.

6. The display device of claim 1, wherein the color-varying particles comprise red-varying particles, green-varying particles and blue-varying particles,
wherein the red-varying particles are disposed in the first pixel region, and each red-varying particle includes a transparent core and a shell surrounding the core and is capable of being changed between a transparent state and a red state,
wherein the green-varying particles are disposed in the second pixel region, and each green-varying particle includes a transparent core and a shell surrounding the core and is capable of being changed between a transparent state and a green state, and
wherein the blue-varying particles are disposed in the third pixel region, and each blue-varying particle includes a transparent core and a shell surrounding the core and is capable of being changed between a transparent state and a blue state.

7. The display device of claim 1, wherein the variable light-transmitting panel comprises:
a second substrate and a third substrate facing each other;
a second thin film transistor on a second surface of the second substrate opposite to a first surface;
a third electrode connected to the second thin film transistor;
a black matrix on the third substrate and between adjacent pixel regions; and
a fourth electrode on the third substrate and opposite to the third electrode.

8. The display device of claim 1, wherein the black-varying particles comprise a transparent core and a shell surrounding the core and are capable of changing between a transparent state and a black state.

9. The display device of claim 1, wherein the color-varying particles are dispersed in a first solid electrolyte to form a variable color layer.

10. The display device of claim 9, further comprising a first counter material layer disposed between the variable color layer and the first electrode.

11. The display device of claim 1, wherein the black-varying particles are dispersed in a second solid electrolyte to form a variable light-blocking layer.

12. The display device of claim 11, further comprising a second counter material layer disposed between the variable light-blocking layer and the fourth electrode.

13. The display device of claim 1, wherein the first electrode is selectively applied with a voltage to the color-varying particles in the first, second, and third pixel regions.

14. A reflection type display device, comprising:
first, second, and third substrates, facing each other;
a variable color layer between the first and second substrates, capable of changing between one of red, green, blue states to a transparent state; and
a variable light-blocking layer between the second and third substrates, capable of changing between a transparent state and a black state,
wherein the variable color layer includes red-varying particles, green-varying particles and blue-varying particles, each particles having a transparent core and a shell surrounding the transparent core.

15. The display device of claim 14, further comprising a reflection layer reflecting incident light over the first substrate.

16. The display device of claim 14, wherein the red-varying particles, green-varying particles are dispersed in a first solid electrolyte.

17. The display device of claim 14, wherein the variable light-blocking layer includes black-varying particles, each having a transparent core and a shell surrounding the core.

18. The display device of claim 17, wherein the black-varying particles are dispersed in a second solid electrolyte.

* * * * *